United States Patent
Salfelner

(10) Patent No.: US 8,746,574 B2
(45) Date of Patent: Jun. 10, 2014

(54) TRANSMITTER, RECEIVER, ANTENNA ARRANGEMENT FOR USE WITH A TRANSMITTER OR FOR USE WITH A RECEIVE, AND RFID TRANSPONDER

(75) Inventor: Anton Salfelner, Pernegg (AT)

(73) Assignee: NXP, B.V., Eindhoven (NL)

( * ) Notice: Subject to any disclaimer, the term of this patent is extended or adjusted under 35 U.S.C. 154(b) by 1339 days.

(21) Appl. No.: 12/280,184

(22) PCT Filed: Jan. 30, 2007

(86) PCT No.: PCT/IB2007/050309
§ 371 (c)(1),
(2), (4) Date: Oct. 15, 2008

(87) PCT Pub. No.: WO2007/096789
PCT Pub. Date: Aug. 30, 2007

(65) Prior Publication Data
US 2009/0242633 A1  Oct. 1, 2009

(30) Foreign Application Priority Data

Feb. 24, 2006  (EP) ...................... 06110388

(51) Int. Cl.
*G06K 19/06*  (2006.01)
(52) U.S. Cl.
USPC .......................... 235/492; 235/487
(58) Field of Classification Search
USPC .................... 235/487, 492, 439, 451
See application file for complete search history.

(56) References Cited

U.S. PATENT DOCUMENTS

| | | | | |
|---|---|---|---|---|
| 4,818,855 A | * | 4/1989 | Mongeon et al. | 235/440 |
| 5,099,227 A | * | 3/1992 | Geiszler et al. | 340/572.5 |
| 5,448,110 A | * | 9/1995 | Tuttle et al. | 257/723 |
| 5,542,106 A | * | 7/1996 | Krenz et al. | 455/575.7 |
| 5,623,271 A | * | 4/1997 | Ponnapalli | 343/895 |
| 6,028,564 A | | 2/2000 | Duan et al. | |
| 6,144,346 A | * | 11/2000 | Boy | 343/866 |
| 6,172,608 B1 | * | 1/2001 | Cole | 340/572.1 |
| 6,177,872 B1 | * | 1/2001 | Kodukula et al. | 340/572.7 |
| 6,346,922 B1 | * | 2/2002 | Proctor et al. | 343/795 |
| 6,375,780 B1 | | 4/2002 | Tuttle et al. | |
| 6,424,309 B1 | * | 7/2002 | Johnston et al. | 343/767 |
| 6,424,820 B1 | * | 7/2002 | Burdick et al. | 455/41.1 |
| 6,741,178 B1 | * | 5/2004 | Tuttle | 340/572.1 |

(Continued)

FOREIGN PATENT DOCUMENTS

WO    2007025024 A2    3/2007

OTHER PUBLICATIONS

Collins, Jonathan. "KSW Makes Dual-Antenna Tags." RFID Journal. Nov. 18, 2005.

*Primary Examiner* — Paultep Savusdiphol

(57) ABSTRACT

An antenna arrangement comprises an electric antenna (4) configured to receive a reception signal from a sender and at least one conductive loop (3, 25) with two terminals (16, 17) to be connected to a receiver circuit (2, 24) which is configured to process an electric signal generated by the at least one conductive loop (3, 25). The at least one conductive loop (3, 25) is spaced within a distance from and magnetically coupled to the electric antenna (4) such that the at least one conductive loop (4, 25) generates the electric signal in response to the reception signal received by the electric antenna (4). Alternatively, the antenna arrangement may be used as a sending antenna used with a transmitter.

10 Claims, 2 Drawing Sheets

(56) References Cited

U.S. PATENT DOCUMENTS

| | | | |
|---|---|---|---|
| 6,762,729 B2 * | 7/2004 | Egashira | 343/767 |
| 6,774,865 B1 | 8/2004 | Serra | |
| 7,019,698 B2 * | 3/2006 | Miyoshi et al. | 343/700 MS |
| 7,050,013 B2 * | 5/2006 | Kim et al. | 343/770 |
| 7,081,860 B2 * | 7/2006 | Schadler et al. | 343/767 |
| 7,088,298 B1 * | 8/2006 | Chan | 343/727 |
| 7,133,810 B2 * | 11/2006 | Butler et al. | 703/2 |
| 7,215,292 B2 * | 5/2007 | McLean | 343/725 |
| 7,362,285 B2 * | 4/2008 | Webb et al. | 343/866 |
| 7,696,947 B2 * | 4/2010 | Gallschuetz et al. | 343/860 |
| 7,893,886 B2 * | 2/2011 | Schadler | 343/767 |
| 2003/0078012 A1 * | 4/2003 | Ito et al. | 455/82 |
| 2005/0057422 A1 * | 3/2005 | Deguchi et al. | 343/867 |
| 2005/0280598 A1 * | 12/2005 | Webb et al. | 343/867 |
| 2006/0001138 A1 * | 1/2006 | Sakama et al. | 257/678 |
| 2006/0043198 A1 * | 3/2006 | Forster | 235/492 |
| 2006/0044769 A1 * | 3/2006 | Forster et al. | 361/760 |
| 2006/0158380 A1 | 7/2006 | Son et al. | |
| 2007/0052613 A1 * | 3/2007 | Gallschuetz et al. | 343/860 |

* cited by examiner

TRANSMITTER, RECEIVER, ANTENNA ARRANGEMENT FOR USE WITH A TRANSMITTER OR FOR USE WITH A RECEIVE, AND RFID TRANSPONDER

FIELD OF THE INVENTION

The invention relates to a transmitter, a receiver, an antenna arrangement for use with a receiver or for use with a transmitter, and to an RFID transponder.

BACKGROUND OF THE INVENTION

An example of a transmitter or receiver is a so-called radio frequency identification (RFID) transponder used, for example, as an RFID tag or label. The transponder comprises a substrate, a receiver/transmitter circuit, and at least one conductive loop used as an antenna. The transponder receives queries from a base station and responds to them. The queries are transmitted by a transmission signal with a certain frequency, for example around 850 MHz to 960 MHz. The conductive loop of the transponder is the antenna that receives or transmits a transmission signal. The inductance of the conductive loop and an input or driving capacitance of the receiver/transmitter circuit form an LC-resonance circuit which is usually tuned to the frequency of the transmission signal through the choice of an appropriate conductive loop.

The integrated circuit and the conductive loop are normally arranged on a substrate, such as paper or an appropriate plastic sheet. Different materials for the substrate and different materials around the transponder in use may have different dielectric values, affecting the tuning of the antenna of the transponder negatively.

U.S. Pat. No. 6,028,564 discloses a receiver, specifically an RFID tag, comprising an antenna used as a voltage and power source designed to operate with an arbitrary load or front end. The antenna has an antenna section which comprises at least one element and at least one antenna terminal, and at least one loading bar placed adjacent to the elements at a spacing distance. The real part of the antenna input impedance is changed through adjustment of the load bar length, width, or spacing distance and by the number of loading bars.

OBJECT AND SUMMARY OF THE INVENTION

It is an object of the invention to provide an antenna arrangement whose performance is less dependent on characteristics of materials surrounding the antenna arrangement.

Further objects of the invention are to provide a receiver, a transmitter, and an RFID transponder whose performances are less dependent on characteristics of materials surrounding the receiver, transmitter, or transponder.

The object of the invention is achieved by means of an antenna arrangement for use with a receiver, comprising an electric antenna configured to receive a reception signal from a sender, and at least one conductive loop with two terminals to be connected to a receiver circuit which is configured to process an electric signal generated by the at least one conductive loop. The at least one conductive loop is spaced within a distance from and is magnetically coupled to the electric antenna such that the at least one conductive loop generates the electric signal in response to the reception signal received by the electric antenna.

The inventive antenna arrangement comprises the electric antenna which is the main structure for receiving the reception signal from the external sender. An electric antenna is an antenna having an impedance of more than $120\,\pi\Omega$ in its near field. This is in contrast to a magnetic antenna which is an antenna having an impedance of less than $120\,\pi\Omega$ in its near field. Magnetic antennas can be considered as tuned conductive loops.

Examples of an electric antenna are a monopole, a dipole, and a multipole antenna, or any alterations of a dipole antenna, such as a folded antenna, a bow-tie antenna, or a slot antenna.

The electric antenna is the main structure of the inventive antenna arrangement which is to be coupled to the sending antenna of the external sender sending signals to a receiver configured with the inventive antenna arrangement. The electric antenna is spaced apart from and is magnetically coupled to the at least one conductive loop. Due to the magnetic coupling, the reception signal captured by the electric antenna induces the electric signal in the at least one conductive loop. A receiver circuit of a receiver configured with the inventive antenna arrangement is connected to the terminals of the at least one conductive loop and accepts the electric signals induced by the electric antenna.

The object is also achieved in accordance with the invention by means of an antenna arrangement for use with a transmitter circuit, comprising an electric antenna configured to send a transmission signal to a receiver and at least one conductive loop with two terminals to be connected to a driving circuit of a transmitter circuit. The driving circuit injects an electric signal into the at least one conductive loop which is spaced within a distance from and is magnetically coupled to the electric antenna such that the electric antenna generates the transmission signal in response to the electric signal injected into the at least one conductive loop.

The inventive antenna arrangement may also be used for a transmitter. Then, the electric antenna is the main structure for sending the transmission signal to an external receiver. As described above, an electric antenna is an antenna having an impedance of more than $120\,\pi\Omega$ in its near field.

The inventive antenna arrangement is intended to be used with the transmitter circuit of the transmitter and particularly to be connected to the driving circuit of the transmitter circuit via the terminals of the at least one conductive loop. During operation, the driving circuit injects the electric signal into the at least one conductive loop. Due to the magnetic coupling, the electric signal causes the sending signal in the electric antenna, which then transmits the sending signal to the external receiver.

The electric antenna is the main component for receiving the reception signal or for sending the transmission signal. Thus, the design constraints for the at least one conductive loop are less stringent than for antenna arrangements with a conductive loop as the main antenna component. The at least one conductive loop may accordingly be designed as a relatively small conductive loop, preferably having a conductive track of less than 2 mm, or even less than 1 mm in cross-section. Especially if the inventive antenna arrangement is arranged together with the receiver or transmitter circuits on a substrate, such as paper or a plastic sheet, the at least one conductive loop can be manufactured in a relatively simple manner by printing or etching techniques.

The degree of magnetic coupling between the electric antenna and the at least one conductive loop can be adjusted through adjustment of the distance between the electric antenna and the at least one conductive loop. Preferably, this distance is less than 20 mm and more preferably less than 10 mm or even 5 mm. The electric antenna may particularly be a broad-band antenna, such as a bow-tie antenna. Varying the distance between the antenna arrangement and the at least one conductive loop renders it possible to adjust the bandwidth of the inventive antenna arrangement appropriately.

At least a first part of the electric antenna and at least a second part of the at least one conductive loop may be parallel to each other. These two parts may particularly be used for the magnetic coupling of the electric antenna and the at least one conductive loop. Preferably, the distance between the two parallel sections is less than 20 mm, and more preferably less than 10 mm or even 5 mm.

The at least one conductive loop and the electric antenna may be of any suitable shape. In a restricted version of the inventive antenna arrangement, both the at least one conductive loop and the electric antenna are essentially symmetrically shaped. The at least one conductive loop and the electric antenna then each have a location of essentially the same electric potential. These two locations may be electrically interconnected.

The receiver with which the inventive antenna arrangement may be configured may comprise an input capacitance which forms an LC-resonance circuit with the inductance of the at least one conductive loop. In order to improve the performance of the receiver configured with the inventive antenna arrangement, the at least one conductive loop may be shaped so that this LC-resonance circuit is tuned to a carrier frequency of the reception signal. Particularly, since the at least one conductive loop can be made relatively small, the resulting LC-resonance circuit is more robust to dielectric characteristics of materials surrounding the receiver configured with the inventive antenna arrangements than are standard configurations. This enhances the application possibilities of such a receiver.

The driving circuit of the transmitter with which the inventive antenna arrangement may be used may comprise an output capacitance which forms an LC-resonance circuit with the inductance of the at least one conductive loop. In order to improve the performance of the transmitter configured with the inventive antenna arrangement, the at least one conductive loop may be shaped such that this LC-resonance circuit is tuned to a carrier frequency of the transmission signal. The at least one conductive loop can be made relatively small, so the resulting LC-resonance circuit is more robust to dielectric characteristics of materials surrounding the transmitter including the antenna arrangements than are standard configurations. This enhances the application possibilities of a transmitter configured with the inventive antenna arrangement.

The object is also achieved in accordance with the invention by means of a receiver comprising an electric circuit, which may be an integrated circuit, and the inventive antenna arrangement. The electric circuit, the at least one conductive loop, and the electric antenna may be arranged on a substrate. The electric circuit may have an input capacitance forming a resonance circuit with the inductance of the at least one conductive loop. Particularly, the size and shape of the at least one conductive loop may be chosen such that this resonance circuit is tuned to a frequency of a reception signal of the inventive receiver.

In a preferred embodiment of the inventive receiver, the at least one conductive loop is integrated into the integrated circuit. The inventive receiver can thus be manufactured in a relatively cost-effective manner and may particularly be robust to dielectric properties of materials that surround the inventive receiver during operation. Additionally, since the at least one conductive loop and the electric antenna are not coupled galvanically, the inventive receiver is particularly robust to electrical discharges.

The object is also achieved in accordance with the invention by means of a transmitter comprising an electric circuit, which may be an integrated circuit, and the inventive antenna arrangement. The electric circuit, the at least one conductive loop, and the electric antenna may be arranged on a substrate. The electric circuit may have an output capacitance forming a resonance circuit with the inductance of the at least one conductive loop. Particularly, the size and shape of the at least one conductive loop may be chosen so that this resonance circuit is tuned to a frequency of a sending signal of the inventive receiver.

In a preferred embodiment of the inventive transmitter, the at least one conductive loop is integrated into the integrated circuit. The inventive transmitter can thus be manufactured in a relatively cost-effective manner and may particularly be robust to dielectric properties of materials that surround the inventive transmitter during operation. Additionally, since the at least one conductive loop and the electric antenna are not in direct electrical contact, the inventive transmitter is particularly robust to electric discharges.

The object of the present invention is further achieved by means of an RFID transponder comprising an electric circuit and the inventive antenna arrangement. The antenna arrangement is configured such that the electric antenna generates the transmission signal in response to a first electric signal injected into the at least one conductive loop by the electric circuit and/or such that the at least one conductive loop generates a second electric signal in response to the reception signal received by the electric antenna.

Preferably, the electric circuit is an integrated circuit which may comprise in particular the at least one conductive loop as an integrated part. Since the electric antenna does not need to be coupled directly to the integrated circuit, the inventive receiver, transmitter, or transponder can be manufactured in a relatively cost-effective manner.

The inventive RFID transponder may comprise a substrate, such as a plastic sheet or a paper, on which the electric circuit and the at least one conductive loop are arranged. It is possible to manufacture the substrate with the electric circuit and the at least one conductive loop separately, and to attach this part of the transponder to a separate item on which the electric antenna is already attached or will subsequently be attached. Alternatively, the electric antenna may be arranged on the substrate.

As described above, the electric antenna of the inventive antenna arrangement, receiver, transmitter, and RFID transponder is an antenna having an impedance of more than $120\pi\Omega$ in its near field. This is in contrast to a magnetic antenna which is an antenna having an impedance of less than $120\pi\Omega$ in its near field. Magnetic antennas can be considered as tuned conductive loops. Preferably, the electric antenna has a size greater than $\lambda/30$ wherein $\lambda$ is the wavelength of the carrier frequency of the transmission or reception signal. For example, if the electric antenna is a dipole or a monopole, then its length is greater than $\lambda/30$. If the electric antenna is a bow-tie antenna, then its expansion along the longitudinal axis of the bow-tie antenna is preferably greater than $\lambda/30$.

The carrier frequency of the inventive receiver, transmitter, or transponder is preferably of an ultra high frequency, particularly higher than 800 MHz.

BRIEF DESCRIPTION OF THE DRAWINGS

The invention will be described in greater detail hereinafter, by way of non-limiting examples, with reference to the embodiments shown in the drawings.

DESCRIPTION OF EMBODIMENTS

Figure 1:
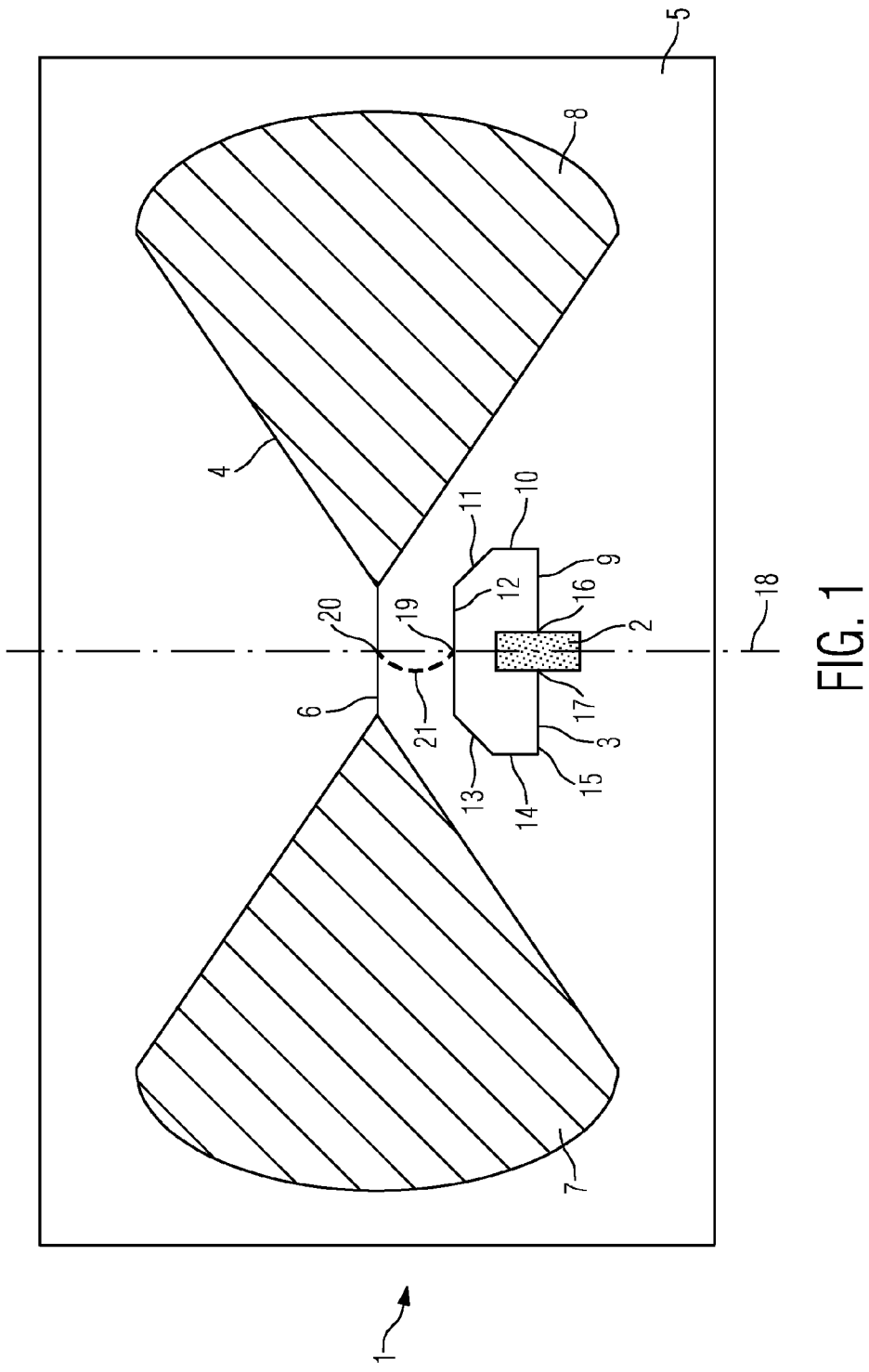
FIG. 1 shows a first exemplary embodiment of an inventive receiver or transmitter.

FIG. 1 shows a first exemplary embodiment of a receiver/transmitter configured with an inventive antenna arrangement. In this exemplary embodiment, the receiver/transmitter is an RFID-transponder 1 comprising an integrated circuit 2, one conductive loop 3, and an electric antenna, which is a bow-tie antenna 4 in this particular example. The integrated circuit 2, the conductive loop 3, and the bow-tie antenna 4 are each arranged on a common substrate 5 which is a conventional sheet of plastic commonly used for RFID-transponders. The conductive loop 3 and the bow-tie antenna 4 are manufactured by means of printing on the substrate 5. The conductive loop 3 is made as a conductive track having a diameter of 0.5 mm in this exemplary embodiment.

The bow-tie antenna 4 is shaped symmetrically here and comprises three sections, i.e. a straight conductive track 6 and two areas 7, 8 interconnected by the straight conductive track 6. The two areas 7, 8 may each have a surface area of 4 by 2 inches. The conductive loop 3 is also shaped essentially symmetrically and comprises several straight sections 9 to 15. Section 12 of the conductive loop 3 is parallel to and spaced apart by 6 mm from the conductive track 8 of the bow-tie antenna 4.

The transponder 1 is designed to receive queries from a base station and to respond to them. The integrated circuit 2 is designed to process the queries and to generate the response in a manner well-known in the art of transponders. The base station is familiar to those skilled in the art and is therefore not shown in FIG. 1. The base station transmits the queries by means of a transmission signal with a carrier frequency of 912 MHz in this exemplary embodiment. The bow-tie antenna 4, which is tuned to the carrier frequency of the transmission signal in this exemplary embodiment, captures the transmission signal sent by the base station as a reception signal. Since the bow-tie antenna 4 is relatively close to the conductive loop 3, the bow-tie antenna 4 and the conductive loop 3 are magnetically coupled, so that the reception signal of the bow-tie antenna 4 generates a significant electric signal with a frequency of the reception signal in the conductive loop 3.

The conductive loop 3 has an inductance L and comprises two terminals 16, 17 which are connected to the integrated circuit 2. The integrated circuit 2 has a well-known front end for pre-processing the electric signal of the conductive loop 3 induced by the bow-tie antenna 4, so that the integrated circuit 2 can process this electrical signal further, as is known in the art of RFID-transponders. The front end of the integrated circuit 2 has an input impedance Z and particularly an input capacitance C. The input capacitance C of the integrated circuit 2 and the inductance L of the conductive loop 3 form a parallel resonance circuit having the resonance frequency:

$$f_r = \frac{1}{2\pi\sqrt{LC}}$$

The inductance L of the conductive loop 3 depends on the size of the conductive loop 3. In the present exemplary embodiment, the size of the conductive loop 3 is chosen such that the resonance frequency $f_r$ of this resonance circuit is tuned to the carrier frequency of the reception signal.

The bow-tie antenna 4 and the conductive loop 3 are symmetrical with respect to an axis 18. Thus, the intersection 19 of the axis 18 with the section 12 of the conductive loop 3 and the intersection 20 of the conductive track 6 of the bow tie-antenna 4 with the axis 18 have essentially the same electric potential and may optionally be interconnected, for example by a conductor track 21.

As described above, the transponder 1 receives queries from the base station, i.e. the bow-tie antenna 4 captures the reception signal comprising information about the queries. The reception signal induces the electric signal in the conductive loop 3 such that the integrated circuit 2 can process this electric signal, which also comprises information about the queries. In response to the queries, the integrated circuit 2 generates a further electric signal and injects it into the conductive loop 3. The further electric signal injected into the conductive loop 3 induces a transmission signal in the bow-antenna 4, which transmits the transmission signal comprising information about the response of the transponder 1.

Figure 2:
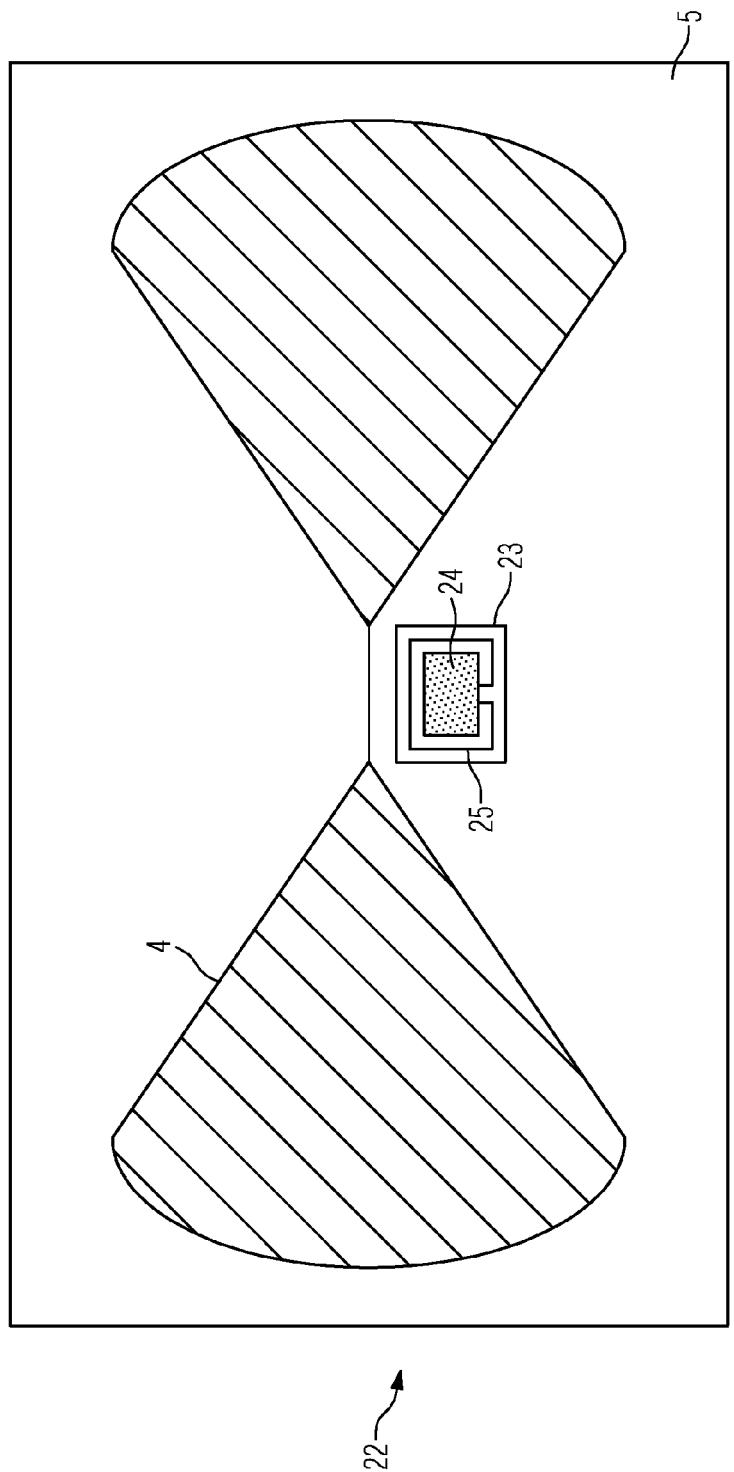
FIG. 2 shows a second exemplary embodiment of an inventive receiver or transmitter.

FIG. 2 shows a second exemplary embodiment of an RFID transponder 22. If not explicitly mentioned, components of the transponder 1 depicted in FIG. 1 and components of the transponder 22 depicted in FIG. 2 that are substantially identical are denoted with the same reference numerals.

The transponder 22 of FIG. 2 has also a substrate 5 on which a bow-tie antenna 4 is arranged. In contrast to the integrated circuit 2 of the transponder 1 shown in FIG. 1, the transponder 22 of FIG. 2 comprises an integrated circuit 23 which does not only process the queries sent from the base station and produces the appropriate response with a processing unit 24, but also comprises a conductive loop 25 that is integrated into the integrated circuit 23 and is connected to the processing unit 24. The conductive loop 25 has an inductance L that is dependent on its size. The conductive loop 25 is shaped and sized such that its inductance L and an input capacitance C of the processing unit 24 form a resonance circuit tuned to the frequency of the transmission signal of the base station.

The bow-tie antenna 4 and the integrated circuit 23 are spaced by a distance close enough so that the bow-tie antenna 4 and the conductive loop 25 are magnetically well coupled. Thus, if the bow-tie antenna 4 captures the signal sent by the base station as the reception signal, an electric signal is induced in the conductive loop 25. The reception signal and the electric signal induced in the conductive loop 25 in response to the reception signal comprise information about the queries sent by the base station. The processing unit 24 accepts the electric signal of the conductive loop 25 and processes it. The processing unit 24 generates a further signal in response to the received queries. The further signal is injected into the conductive loop 24, which causes a transmission signal in the bow-tie antenna 4. The bow-tie antenna 4 transmits the transmission signal to the base station.

In the Figures, the bow-tie antenna 4 is arranged on the same substrate 5 as the rest of the transponders 1, 22. Particularly, it is also possible to arrange only the integrated circuit 2 with the conductive loop 3 on the substrate 5 and to arrange the substrate 5 including the integrated circuit 2 and the conductive loop 3 next to the bow-tie antenna 4 without attaching the bow-tie antenna 4 to the substrate 5. Needless to say, the bow-tie antenna 4 is merely an example of an electric antenna.

Finally, it should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. The singular reference of an element does not exclude the plural reference of such an element, and vice-versa. In a device claim enumerating several means, several of these means may be embodied by one and the same item of software or hardware. The mere fact that certain measures are recited in mutually different dependent claims does not indicate that a combination of these measures cannot be used to advantage.

The invention claimed is:

1. An antenna arrangement for use with a receiver, comprising:
   an electric antenna having an impedance of more than 120 $\pi\Omega$ in its near field and configured to receive a reception signal from a sender; and
   at least one conductive loop with two terminals to be connected to a receiver circuit which is configured to process an electric signal generated by said at least one conductive loop; said at least one conductive loop being spaced within a distance from and only magnetically coupled to said electric antenna such that said at least one conductive loop generates said electric signal in response to said reception signal received by said electric antenna;
   wherein said at least one conductive loop and said electric antenna are symmetrically shaped such that said at least one conductive loop and said electric antenna each have a location of essentially the same electric potential; said locations being interconnected.

2. The antenna arrangement of claim 1, wherein said at least one conductive loop has an inductance, resulting in an LC-resonance circuit with an input capacitance of said receiver circuit, and said at least one conductive loop is designed such that said LC-resonance circuit is tuned to a carrier frequency of said reception signal.

3. The antenna arrangement of claim 1, wherein at least a first part of said electric antenna and at least a second part of said at least one conductive loop are parallel to each other.

4. A receiver, comprising:
   an integrated circuit with at least one conductive loop integrated into said integrated circuit; said integrated circuit being configured to process an electric signal generated by said at least one conductive loop; and
   an electric antenna having an impedance of more than 120 $\pi\Omega$ in its near field and configured to receive a reception signal from a sender; said electric antenna being spaced within a distance of said integrated circuit and only magnetically coupled to said at least one conductive loop such that said at least one conductive loop generates said electric signal in response to said reception signal received by said electric antenna.

5. An antenna arrangement for use with a transmitter, comprising:
   an electric antenna having an impedance of more than 120 $\pi\Omega$ in its near field and configured to send a transmission signal to a receiver; and
   at least one conductive loop with two terminals to be connected to a driving circuit of a transmitter; said driving circuit injecting an electric signal into said at least one conductive loop, which is spaced within a distance from and only magnetically coupled to said electric antenna such that said electric antenna generates said transmission signal in response to said electric signal injected into said at least one conductive loop;
   wherein at least a first part of said electric antenna and at least a second part of said at least one conductive loop are parallel to each other; and
   wherein said at least one conductive loop and said electric antenna are essentially symmetrically shaped such that said at least one conductive loop and said electric antenna each have a location of essentially the same electric potential; said locations being interconnected.

6. The antenna arrangement of claim 5, wherein said at least one conductive loop has an inductance resulting in an LC-resonance circuit with an output capacitance of said driving circuit, and said at least one conductive loop is designed such that said LC-resonance circuit is tuned to a carrier frequency of said transmission signal.

7. A transmitter, comprising:
   an integrated circuit with at least one conductive loop integrated into said integrated circuit; said integrated circuit being configured to inject an electric signal generated by said at least one conductive loop; and
   an electric antenna having an impedance of more than 120 $\pi\Omega$ in its near field and configured to send a transmission signal to a receiver; said electric antenna being spaced within a distance of said integrated circuit and only magnetically coupled to said at least one conductive loop such that said electric antenna generates said transmission signal in response to said electric signal injected into said at least one conductive loop.

8. An RFID transponder, comprising:
   an electric circuit; and
   an antenna arrangement comprising an electric antenna having an impedance of more than 120 $\pi\Omega$ in its near field and configured to receive a reception signal from an external sender and/or to send a transmission signal to an external receiver, and at least one conductive loop with two terminals connected to said electric circuit; said at least one conductive loop being spaced apart within a distance from and being only magnetically coupled to said electric antenna such that said electric antenna generates said transmission signal in response to a first electric signal injected into said at least one conductive loop by said electric circuit and/or such that said at least one conductive loop generates a second electric signal in response to said reception signal received by said electric antenna;
   wherein said electric circuit is an integrated circuit comprising said at least one conductive loop as an integrated part.

9. The RFID transponder of claim 8, comprising a substrate on which said electric circuit and said at least one conductive loop are arranged.

10. The RFID transponder of claim 9, wherein said electric antenna is arranged on said substrate.

* * * * *